United States Patent [19]

Lundberg et al.

[11] 4,193,909

[45] Mar. 18, 1980

[54] FLOWER POT AND METHOD FOR MAKING

[75] Inventors: John A. Lundberg, Columbus; Robert J. Schafer, Worthington; Richard H. Toeniskoetter, Worthington; Richard L. Pelfrey, Worthington, all of Ohio

[73] Assignee: Ashland Oil, Inc., Ashland, Ky.

[21] Appl. No.: 944,507

[22] Filed: Sep. 21, 1978

Related U.S. Application Data

[63] Continuation-in-part of Ser. No. 778,293, Mar. 16, 1977.

[51] Int. Cl.$^2$ .......................... C08K 3/36; C08K 9/06
[52] U.S. Cl. .................................... 260/42.15; 47/66; 260/37 N; 264/122; 264/234
[58] Field of Search ............... 260/37 N, 38, 847, 848, 260/844, 859 R, 859 PV, DIG. 40; 47/66

[56] References Cited

U.S. PATENT DOCUMENTS

| | | | |
|---|---|---|---|
| 2,274,095 | 2/1942 | Sawyer | 47/66 X |
| 2,810,989 | 10/1957 | Terry | 47/66 |
| 2,848,842 | 8/1958 | Tennant | 47/66 X |
| 2,888,433 | 5/1959 | Parker | 260/859 PV X |
| 2,893,969 | 7/1959 | Graham et al. | 260/859 PV X |
| 3,035,623 | 5/1962 | Goetz | 47/66 X |
| 3,174,940 | 3/1965 | Lacoste | 47/66 X |
| 3,290,165 | 12/1966 | Iannicelli | 260/38 X |
| 3,676,392 | 7/1972 | Robins | 260/38 |
| 3,954,695 | 5/1976 | Cleland | 260/DIG. 40 |
| 3,988,284 | 10/1976 | Wurmb et al. | 260/859 R X |

*Primary Examiner*—Sandra M. Person
*Attorney, Agent, or Firm*—Van D. Harrison, Jr.

[57] ABSTRACT

Disclosed is a resin-aggregate mixture comprising polyurethane resin, aggregate (sand), silane compounds, iron oxide and powdered thermoplastic resins. Flower pots from this composition are cured either with a tertiary amine, base, or metallic ion. The cured pots subsequently are baked at a temperature sufficient to fuse the thermoplastic resin to provide a pot having air permeability but resistance to the permeation of water.

8 Claims, No Drawings

FLOWER POT AND METHOD FOR MAKING

This is a continuation-in-part of co-pending application Ser. No. 778,293, filed Mar. 16, 1977, and now abandoned.

NATURE OF THE INVENTION

This invention relates to horticultural containers, to processes for preparing them, and to molding compositions used in these processes. More particularly, this invention relates to flower pots and saucers comprising sand particles bonded with synthetic resin.

BACKGROUND OF THE INVENTION

Co-pending application Ser. No. 778,293 discloses a method for molding horticultural containers, such as flower pots, from a molding composition comprising polyurethane resin, aggregate (sand), silane compounds and iron oxide. The pots are molded and the composition cured either by means of a base or metal catalyst in situ in the resin or by means of an amine gas flowed through the mold. The flower pots produced by this technique have proved serviceable and satisfactory for many purposes particularly where drainage of excess water from the pots can be ignored. In many uses, however, when saucers intended to support the pots and to catch any excess water have been made of this molding composition, the permeability of the cured composition to water has been too great. The saucers have not retained excess water and consequently home furnishings such as rugs and tabletops can be soiled or stained when the pots have been positioned in such saucers. This same problem has occurred in using these types of flower pots when they are absent a drainage hole. In this latter type of pot, the grower plans to water only moderately but expects the pot to retain any excess water.

Although it is desirable to have waterproof saucers and flower pots, it is also desirable to have a pot of porous nature so that the roots of plants contained therein can be aerated to promote both root and top growth.

An object of this invention, therefore, is to provide a horticultural container, such as a flower pot or drainage saucer, having both the desired porosity allowing permeability of air while simultaneously retaining accummulated water. Other objects and advantages of the invention will be readily apparent from the following description.

SUMMARY OF THE INVENTION

This invention comprises horticultural containers such as flower pots and drainage saucers made from aggregate (sand) and polyurethane resin, particularly the resin binders described in U.S. Pat. Nos. 3,409,579; 3,432,457; 3,485,797 and 3,676,392. We have discovered that a composition consisting essentially of the aforesaid resin, sand, silane compounds, iron oxide and powdered thermoplastic resins, produces a container permeable to air but capable of retaining accummulated water. In brief this invention, therefore, comprises a horticultural container (a flower pot or saucer) whose composition comprises:

(a) an aggregate;
(b) up to about 10% by weight of a polyurethane resin and curing agent;
(c) a silane compound;
(d) iron oxide; and
(e) powdered thermoplastic resin.

In another aspect this invention comprises a molding composition for flower pots of the above description. In still another aspect this invention constitutes a process for making flower pots comprising the steps of:

(a) molding a container from the afore-described composition;
(b) curing the molded mixture; and
(c) baking the molded mixture at a temperature sufficient to melt or fuse the powdered thermoplastic resin.

DESCRIPTION OF THE INVENTION

In one aspect this invention comprises a composition for molding flower pots and similar porous containers having the following composition:

(a) an aggregate (sand) as a major constituent;
(b) up to about 10% by weight of aggregate of a binder composition comprising in admixture, a polyurethane compound, and a curing agent comprising a base, a metallic ion or a tertiary amine;
(c) a silane compound in a concentration of between 0.0005 to 0.1% based on aggregate and exclusive of solvent carrier;
(d) iron oxide pigment in a ratio of between 0.1 and 5% based on the weight of aggregate; and
(e) particulated or powdered thermoplastic resin in a ratio of between 0.5 and 2.5% based on the weight of aggregate.

The polyurethane resins which can be used in the molding composition of this invention include phenolic, polyether and alkyd oil types. A preferred polyurethane component is a resin binder comprising in admixture a resin component, a hardener component, and a curing agent, said resin component comprising an organic solvent solution of a non-aqueous phenolic resin which comprises a condensation product of a phenol having the general formula:

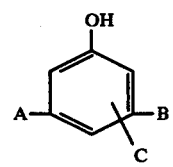

where A, B and C are hydrogen, hydrocarbon radicals, oxyhydrocarbon radicals, or halogen, with an aldehyde having the general formula R'CHO where R' is a hydrogen on a hydrocarbon radical of 1 to 8 carbon atoms; said hardener component comprising liquid polyisocyanate containing at least two isocyanate groups; and said curing agent comprising a base, preferably having a $pk_b$ value of about 7 to 11, a metal ion catalyst, or an amine.

The resin component is prepared from phenols and aldehydes in the manner described in U.S. Pat. No. 3,485,797. Preferably the resin component is a benzylic ether resin having the general formula:

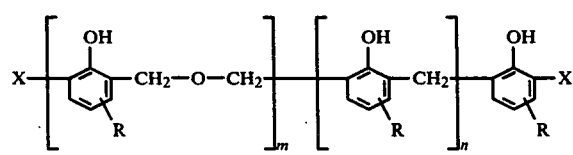

wherein R is hydrogen or a phenolic substituent meta to the hydroxyl group of the phenol, m and n are numbers the sum of which is at least 2, and the ratio of m-to-n is at least 1, and X is a hydrogen or a methylol group, the molar ratio of said methylol group-to-hydrogen being at least 1. U.S. Pat. No. 3,676,392 discloses that these benzylic ether resins can be combined with aliphatic, cycloaliphatic, or aromatic polyisocyanates, and foundry sands to make foundry cores and molds. Preferred isocyanates are the polyaromatic MDI type isocyanates, such as those sold under the tradenames "PAPI" and "MONDUR MR" and mixtures thereof.

Curing is effected in several ways. It can be effected with a base, preferably having a $pk_b$ value in the range of about 7 to about 11, incorporated into the resin, as described in U.S. Pat. No. 3,676,392. Curing can be effected by the incorporation of a metal ion catalyst in the form of a metal salt as disclosed in U.S. Pat. No. 3,432,457. Curing can be effected by exposure to amines, preferably tertiary amines, disclosed in U.S. Pat. No. 3,409,579. U.S. Pat. Nos. 3,409,579; 3,432,457; 3,485,797 and 3,676,392 are incorporated herein by reference.

The aggregate material preferably is silica sand. Other aggregate materials which can be used include zircon, chromite and alumina sands and other various natural materials of appropriate particle size distribution. A particularly preferred sand is one having an AFS fineness of between 80 and 100 and more preferably between 84 and 95 such as Wedron sand.

The silane compound is one having the general formula:

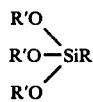

wherein R' is a hydrocarbon radical and preferably an alkyl radical of 1 to 6 carbon atoms and R is an alkyl radical, alkoxy-substituted alkyl radical, vinyl radical, acryloxy-substituted alkyl radical, epoxy substituted alkyl radical, glycidoxy-substituted alkyl radical, mercapto-substituted alkyl radical, ureidosubstituted alkyl radical, alkyl-amino-substituted alkyl radical in which the alkyl groups have from 1 to 6 carbon atoms or it can be other organo-functional silane adhesion promoters. The aforesaid silane is employed in concentrations of about 0.0005 to about 0.1% based on the weight of sand and exclusive of solvent carrier. A preferred range of silane is between about 0.01 to about 0.5% based on weight of sand.

In the molding composition of this invention, the aggregate, e.g. sand, is the major constituent and the binder portion constitutes a relatively minor amount, generally less than 10%, frequently within the range of 0.25 1 to about 5%, these figures being based on the weight of the aggregate. Although the sand employed is preferably dry sand, moisture of up to about 1 weight percent based on the weight of the sand can be tolerated.

The iron used in this invention can be any oxide having the desired color characteristics and a sufficient particle size to be distributed evenly through the moulding composition mix. It is used in a ratio of between 0.1 and 5 parts by weight per 100 parts of aggregate, or preferably between 0.25 and 2 parts per 100 parts of aggregate. Preferably the iron oxide is a naturally occurring tan, yellow or red pigment, such as yellow ocher or the red pigment commonly called Tamm's iron oxide, or a synthetic iron oxide such as the red oxide [$Fe_2O_3$] pigment marketed under the trade designation RO-8097 or the yellow hydrated ferric oxide [$Fe_2O_3 \cdot H_2O$] pigment trade designation YLO 2288B, both marketed by the Pfizer Chemical Company.

Preferred thermoplastic polymer powders for use in the composition of this invention are powdered polyvinyl chloride and powdered polyolefinic polymers. More preferred are the polyolefinic polymers having an average particle size of between 20 and 1200 microns. A particularly preferred polyolefinic powder is polyethylene powder having an average particle size of 300 to 1200 microns (50 to 16 mesh size). Most preferred is a polyethylene powder having a particle size of less than 50 mesh (300 microns).

In the most preferred procedure for mixing the components of the molding mixture of this invention, the silane is first mixed with the aggregate (sand). Ordinarily the silane will be dissolved in a carrier, preferably a volatile liquid such as methanol, methylene chloride, trichloroethane. When methylene chloride or trichloroethane are used, they must be mixed with the silane just prior to mixing with the sand or precipitates may form in the solution. When the silane solution has been mixed with the sand and the major portion of the solvent has evaporated, the iron oxide pigment and powdered thermoplastic resin is added and thoroughly mixed in. Subsequently the resin binder components, for example a phenolic resin of the benzylic ether type, and polyisocyanate of the polymeric MDI type and suitable base or metal ion catalyst, if these catalysts are used, are added and mixed. The composition is then ready for shaping and curing either by allowing the base catalyst to effect curing or by flowing an amine gas or vapor through the molded shape.

The containers, such as flower pots or saucers, are manufactured by packing the uncured mixture into suitable molds. The mixture is then cured either by the base or metal ion catalyst in the mixture or by exposure to an amine catalyst. After curing, the pots are removed. Subsequently the pots are heated at a predetermined temperature to fuse the thermoplastic particles.

EXAMPLE 1

This example illustrates the preparation of flower pots (according to the process of this invention) in what is believed to be the best mode of carrying out the invention. One hundred (100) parts of Wedron 7010 sand were first coated with 1 part of a 1% by weight solution in methanol of gamma-amino-propyltriethoxy silane and mixed until most of the methanol had evaporated. According to the manufacturer, Wedron 7010 sand is 99.88% silica, 0.2% iron oxide, 0.10% aluminum oxide, .015% titanium dioxide, .01% calcium oxide, and 0.005% magnesium oxide, and has the following size distribution: 0.4% retained on U.S. No. 40, 0.4% retained on U.S. No. 50, 8.2% retained on U.S. No. 70, 46.6% retained on U.S. No. 100, 23.2% retained on U.S. No. 140, 15.4% retained on U.S. No. 200, 42% retained on U.S. No. 270, 2.0% retained on U.S. No. 325, and 99.44% Grain fineness (AFS). Polyethylene powder was added at this time in the ratio of 1 part to 100 parts of sand. Iron oxide pigment was then dispersed in the mixture in the ratio of 0.5 parts pigment to 100 parts of sand. The pigment was a mixture of four parts of a yellow iron oxide pigment, trade named "YLO 2288B", and one part of red iron oxide pigment, trade named "RO 8097", both available by the Pfizer Chemical Company. After the iron oxide pigment was dispersed, 1 part each of a commercially available aromatic polyisocyanate and a benzylic ether resin, corresponding to the disclosure of U.S. Pat. No. 3,485,797 and available from Ashland Chemical Company, Columbus, Ohio, were then added. The mixture was then formed into a flower pot by blowing it into a mold. The molded mixture was then cured by flowing dimethylethyl amine mixed with carbon dioxide through the samples. The cured pot was then baked for 15 minutes at 350° F., to produce the finished pot.

EXAMPLE II

This example illustrates the effectiveness of commercially available particulated polyvinyl chloride used in place of the polyethylene powder of Example I and further illustrates the improvement in water retention achieved when the components of applicants' pot molding mixture are used in combination rather than each alone.

Following the procedure of Example I, flower pots were formulated from mixtures basically containing the same Wedron sand, benzylic ether resin and aromatic polyisocyanate of Example I, but in addition in some batches either the silane, the iron oxide or the thermoplastic powder was omitted. In other batches, silane and iron oxide, silane and powdered plastic, and powdered plastic and iron oxide were the components added to the basic composition. In one run, the complete mixture was used but the resulting pot was not baked. The pots were of a standard size having a 3⅜ inch inside diameter at the top, a 3½ inch diameter at the bottom and a depth of 3¼ inches. All other pots were baked at a temperature of 350° F., for 15 minutes. For each mixture, 1 pot was made and tested. Over a period of approximately one hour, 100 milliliter additions of water were poured into each pot at 10 or 20 minute intervals as indicated in Table I and the amount of water filtering through each pot was measured. At the end of the 1-hour test each pot was filled to a volume of 500 milliliters and the amount of water filtering through at 24-hour intervals was measured. For comparison purposes a standard commercially available terra cotta clay pot (Run A) and pots made according to Example I (Run I) were also included in the test. Results obtained are presented in Table 1.

TABLE 1

| Run | 100 parts sand, 1 part benzylic ether resin, 1 part polyisocyanate and - (1) | 0 min. 100 ml. Added - 10 min. Measured | 11 min. 100 ml. Added - 20 min. Measured | 21 min. 100 ml. Added - 20 min. Measured | 31 min. 100 ml. Added - 40 min. Measured | 41 min. filled to 500 ml. level 60 min. Measured | 1 Day | 2 Days | 3 Days | 4 Days | 5 Days |
|---|---|---|---|---|---|---|---|---|---|---|---|
| A | Control | Pot became wet on exterior in 3 min. | 0 | 0 | 19 | 7 | 66 | — | — | 83 | — |
| B | No additive | 0 | 2.5 | 15 | 29 | 69 | 100 | — | — | — | — |
| C | 0.01 silane (2) | 0 | 0 | 0 | 3 | 9 | — | — | 92 | — | 100 |
| D | Iron Oxide pigment 0.4 | 0 | 0 | 0 | 3 | 2 | 61 | — | — | 83 | 90 |
| E | 0.01 silane and 0.4 iron oxide pigment | 0 | 0 | 0 | 7 | 26 | 100 | — | — | — | — |
| F | 1 part thermoplastic resin powder A (3) | 0 | 0 | 0 | 0 | 0 | 0 | 82 | 100 | — | — |
| G | 1 part thermoplastic resin powder A and 0.01 parts silane | 0 | 0 | 0 | 0 | 0 | 0 | 0 | 20 | — | — |
| H | 1 part thermoplastic resin powder A and 0.04 parts iron oxide pigment | 0 | 0 | 0 | 0 | 0 | 0 | 0 | 0 | — | — |
| I | 1 part thermoplastic resin, powder A, 0.01 parts silane 0.4 parts iron oxide pigment | 0 | 0 | 0 | 0 | 0 | 0 | 0 | 0 | — | — |
| J | 1 part thermoplastic resin powder A, 0.01 silane, 0.4 iron oxide pigment (pots not baked) | 0 | 0 | 0 | 10 | 85 | 100 | — | — | — | — |
| K | 1 part thermoplastic resin B | 0 | 0 | 0 | 4 | 4 | 53 | 69 | 87 | — | — |
| L | 1 part thermoplastic resin B, 0.01 part silane | 0 | 0 | 0 | 0 | 0 | 0 | 59 | 74 | — | — |
| M | 1 part thermoplastic resin Binder B, 0.4 parts iron oxide pigment | 0 | 0 | 0 | 0 | 0 | 0 | 0 | 0 | — | — |
| N | 1 part thermoplastic resin powder B, 0.01 parts silane, 0.4 parts iron oxide pigment | 0 | 0 | 0 | 0 | 0 | 0 | 0 | 0 | — | — |
| O | 1 part thermoplastic resin powder C | 0 | 0 | 0 | 0 | 0 | 6 | 10 | — | — | 24 |
| | 1 part thermoplastic resin C, 0.04 parts | | | | | | | | | | |

TABLE 1-continued

| Run | 100 parts sand, 1 part benzylic ether resin, 1 part polyisocyanate and - (1) | 0 min. 100 ml. Added - 10 min. Measured | 11 min. 100 ml. Added - 20 min. Measured | 21 min. 100 ml. Added - 20 min. Measured | 31 min. 100 ml. Added - 40 min. Measured | 41 min. filled to 500 ml. level 60 min. Measured | 1 Day | 2 Days | 3 Days | 4 Days | 5 Days |
|---|---|---|---|---|---|---|---|---|---|---|---|
| P | silane 1 part thermoplastic resin powder C, 0.4 parts iron oxide pigment | 0 | 0 | 0 | 0 | 0 | 6 | 10 | — | — | 12 |
| Q | 1 part thermoplastic resin powder C, 0.01 parts silane, 0.4 parts iron oxide pigment | 0 | 0 | 0 | 0 | 0 | 6 | 11 | — | — | 31 |
| R | 1 part thermoplastic resin powder D, 0.01 parts silane, 0.4 parts iron oxide pigment | 0 | 0 | 0 | 0 | 0 | 6 | 10 | — | — | 63 |
| S | | 0 | 0 | 0 | 0 | 0 | 9 | 16 | — | — | 38 |

(1) cured with dimethylethyl amine
(2) gamma amino propyl triethoxy silane used where a silane is indicated
(3) Commercially available polyethylene powder
(4) Thermoplastic resins B, C and D were commercially available, polyvinyl chloride powder In Table 1, Runs L, N, R and S represent pots made according to the composition and process of this invention. It is readily apparent from Table 1 that the runs made with resin-sand mixtures only, as well as the runs with mixtures containing only a single added component, i.e., silane, iron oxide or plastic powder did not produce pots consistently having any notable resistance to water permeation. The pots made with the polyvinyl chloride plastic powder appeared to have slightly less resistance to water permeation but nevertheless are at an acceptable level for many uses. The pots made with the polyethylene powder incorporated in the mixture, (Run I) showed no water penetration even after a period of 5 days. all pots exhibited excellent air permeability as determined by simple air permeability tests.

I claim:

1. A molded horticultural container structure prepared by:
   (1) forming a uniform admixture of a molding composition comprising:
      (a) an aggregate;
      (b) up to 10 parts by weight of polyurethane resin binder per 100 parts (a);
      (c) from 0.0005–0.1 parts by weight of silane compound per 100 parts (a);
      (d) from 0.1–5 parts by weight of iron oxide pigment per 100 parts (a); and
      (e) from 0.5–2.5 parts by weight per 100 parts (a) of a powdered thermoplastic polymer having an average particle size of from 20–12000 microns.
   (2) molding the resultant admixture to a desired shape;
   (3) curing the shaped mixture;
   (4) baking said molded structure at a temperature to effect fusing of the powdered thermoplastic polymer component thereof.

2. The molded horticultural container structure of claim 1 wherein said polyurethane resin binder consisting essentially of;
   (a) an organic solvent solution of a non-aqueous phenolic resin which comprises a condensation product of a phenol having the general formula:

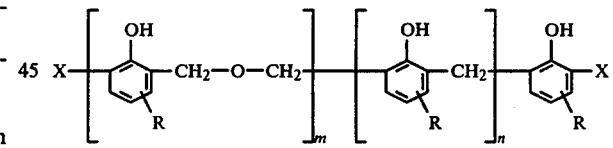

where A, B and C are hydrogen, hydrocarbon radicals, or halogen, with an aldehyde having the general formula R'CHO where R' is a hydrogen of a hydrocarbon radical of 1 to 8 carbon atoms; and
   (b) a hardener component comprising liquid polyisocyanate.

3. The molded horticultural container structure of claim 2 wherein said phenolic condensate product has the general formula:

$$X \left[ \begin{array}{c} OH \\ | \\ \phantom{X}\text{—}CH_2\text{—}O\text{—}CH_2 \\ | \\ R \end{array} \right]_m \left[ \begin{array}{c} OH \\ | \\ \phantom{X}\text{—}CH_2 \\ | \\ R \end{array} \right]_n \begin{array}{c} OH \\ | \\ \phantom{X}\text{—}X \\ | \\ R \end{array}$$

wherein R is hydrogen or a phenolic substituent meta to the hydroxyl group of the phenol, m and n are numbers the sum of which is at least 2, and the ratio of m-to-n is at least 1, and X is a hydrogen or a methylol group, the molar ratio of said methylol group-to-hydrogen being at least 1.

4. The molded horticultural container structure of claim 3 wherein the said silane compound has the general formula:

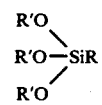

wherein R' is a hydrocarbon radical and preferably an alkyl radical of 1 to 6 carbon atoms and R is an alkyl radical, alkoxy-substituted alkyl radical, vinyl radical, acryloxy-substituted alkyl radical, epoxy-substituted alkyl radical, glycidoxy-substituted alkyl radical, mercapto-substituted alkyl radical, ureido-substituted alkyl radical, alkyl-amino-substituted alkyl radical in which the alkyl groups have from 1 to 6 carbon atoms, or other organo-functional silane adhesion promoters.

5. The molded horticultural container structure of claim 4 wherein the thermoplastic polymer is a polyolefin.

6. The molded horticultural container structure of claim 4 wherein the thermoplastic polymer is polyvinyl chloride.

7. The molded horticultural container structure of claim 5 wherein the thermoplastic polymer is polyethylene.

8. The molded horticultural container structure of claim 7 wherein said polyethylene has an average a particle size of not greater than 300 microns.

* * * * *